AUTOMATIC-FREQUENCY-CONTROL SYSTEM FOR FREQUENCY-MODULATION TELEVISION SYSTEMS

Filed Sept. 19, 1946

2 Sheets-Sheet 1

INVENTORS
WILSON P. BOOTHROYD &
WILLIAM H. FORSTER
BY
Brown, Denk & Synnestvedt
AGENTS May 8, 1951 W. P. BOOTHROYD ET AL 2,552,140

AUTOMATIC-FREQUENCY-CONTROL SYSTEM FOR FREQUENCY-MODULATION TELEVISION SYSTEMS

Filed Sept. 19, 1946 2 Sheets-Sheet 2

INVENTORS
WILSON P. BOOTHROYD &
WILLIAM H. FORSTER
BY
Brown, Denk & Synnestvedt
AGENTS Patented May 8, 1951

2,552,140

UNITED STATES PATENT OFFICE 2,552,140

AUTOMATIC FREQUENCY-CONTROL SYSTEM FOR FREQUENCY-MODULATION TELEVISION SYSTEMS

Wilson P. Boothroyd and William H. Forster, Philadelphia, Pa., assignors to Philco Corporation, Philadelphia, Pa., a corporation of Pennsylvania Application September 19, 1946, Serial No. 698,056

4 Claims. (Cl. 250—36)

Figure 1:
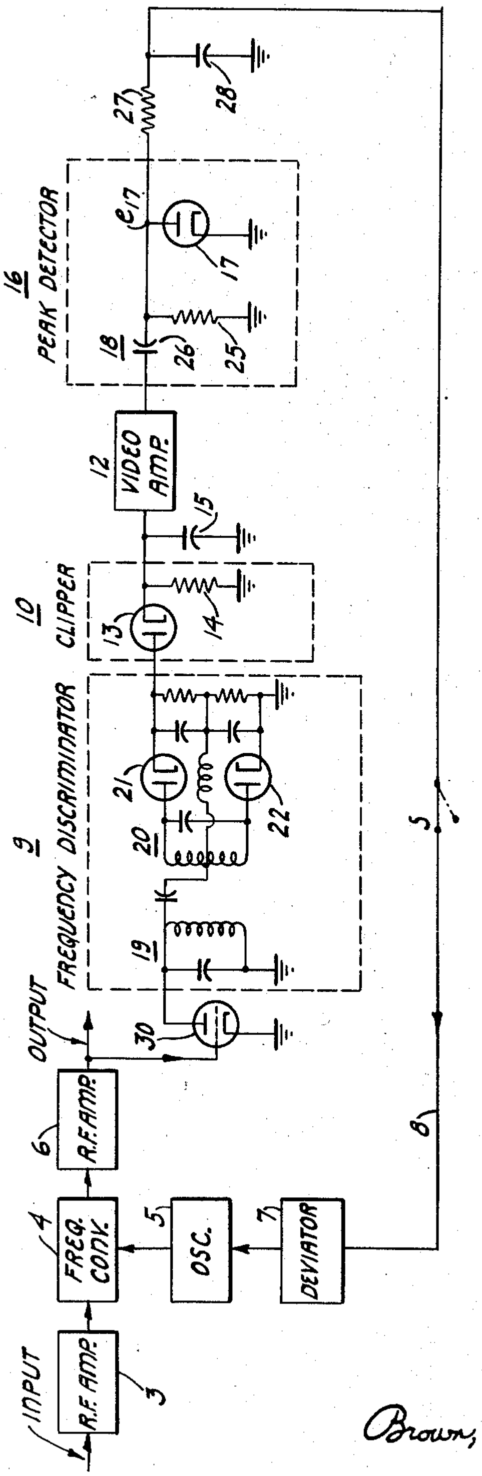

The invention herein claimed and described relates to frequency-modulation carrier wave systems and, in particular, to unsymmetrically modulated frequency-modulation systems in which the modulated carrier signal includes different modulation components, one of which varies over a predetermined frequency-deviation range while a second varies over a deviation range beyond that of the first component. An example of such a system is a frequency-modulated television system wherein, during the transmission of the picture signals, the carrier wave varies within certain fixed predetermined frequency limits, whereas, during the transmission of the synchronizing pulses, the carrier wave is shifted to a fixed preassigned frequency beyond the variation range obtaining during the picture transmission. For proper operation, it is essential that either the black-level frequency (i. e. the blanking-level frequency), or the synchronizing-level frequency (i. e. the synchronizing-pulse-tip frequency) of the modulated carrier, be maintained substantially constant at its preassigned value in order to preserve the D.-C. component of the picture signal, and in order to maintain the modulated carrier within its preassigned band.

The utility of our invention may be demonstrated by describing its application to television systems in which it is necessary, or at least desirable, to convert a modulated carrier to a different frequency. For example, in a television relay-system, the modulated carrier may be received and re-transmitted by one or more relay stations; and in passing through a relay station the carrier is desirably converted from one frequency to another in order to prevent reception of the re-transmitted carrier by the relay receiver. The conversion may be readily accomplished by a conventional frequency-converter employing a beating oscillator; but there is a possibility that, due to the inherent tendency of an oscillator to drift, that is, to shift its frequency as a result of some local circuit condition, the converted modulated carrier may protrude beyond its intended frequency band.

Automatic-frequency-control systems adapted for use with frequency-modulation sound broadcasts are totally inapplicable to frequency-modulation television systems for the reason that in FM television systems there is no fixed mean carrier frequency. On the contrary, the mean frequency is a function of the picture signal and varies with the average tone of the picture being transmitted. Thus, when the picture becomes very dark, the mean frequency will have moved toward the black-level frequency, whereas, when the picture becomes very light, the mean frequency will have moved toward the white-level frequency. Consequently, prior art AFC systems which rely for their operation upon the existence of a fixed mean frequency are inappropriate to FM television systems.

We are aware of one form of automatic-frequency-control system heretofore employed to maintain an unsymmetrically modulated frequency-modulated television carrier wave within a preassigned channel. We refer to the system described and claimed in the copending application of William E. Bradley, filed April 10, 1946, Serial No. 660,866, now U. S. Patent 2,481,902, issued September 13, 1949, assigned to Philco Corporation. While the system therein described is capable of accomplishing the desired automatic frequency control, the arrangement of the present invention has certain practical advantages thereover, including absolute independence of picture content. The arrangement of the instant invention is substantially different from that of Bradley and represents a specific improvement thereover.

It is an object of the present invention to provide an automatic-frequency-control system adapted to maintain an unsymmetrically modulated frequency-modulated carrier wave within a preassigned wave channel.

It is a more specific object of the invention to provide, in a frequency-modulation television system, an automatic-frequency-control system capable of maintaining the synchronizing-level frequency of the modulated carrier at a substantially fixed value, and thereby to maintain the modulated carrier within fixed preassigned frequency limits.

Another object of the invention is to provide an improved arrangement, in a television relay-system, for preventing drift of a converted carrier-frequency by utilizing the converted synchronizing-level frequency as the medium from which control voltages are derived to hold the converted modulated carrier in fixed position, or to return the said carrier to its intended position should it tend to depart therefrom.

Still another object of the present invention is to provide an automatic-frequency-control circuit in a frequency-modulation television system which operates entirely independently of the picture-intelligence component of the transmitted wave.

Another object is to provide, in a television receiver adapted to receive frequency-modulated television signals, means for automatically maintaining the black-level of the reproduced picture at a fixed frequency.

Figure 2:
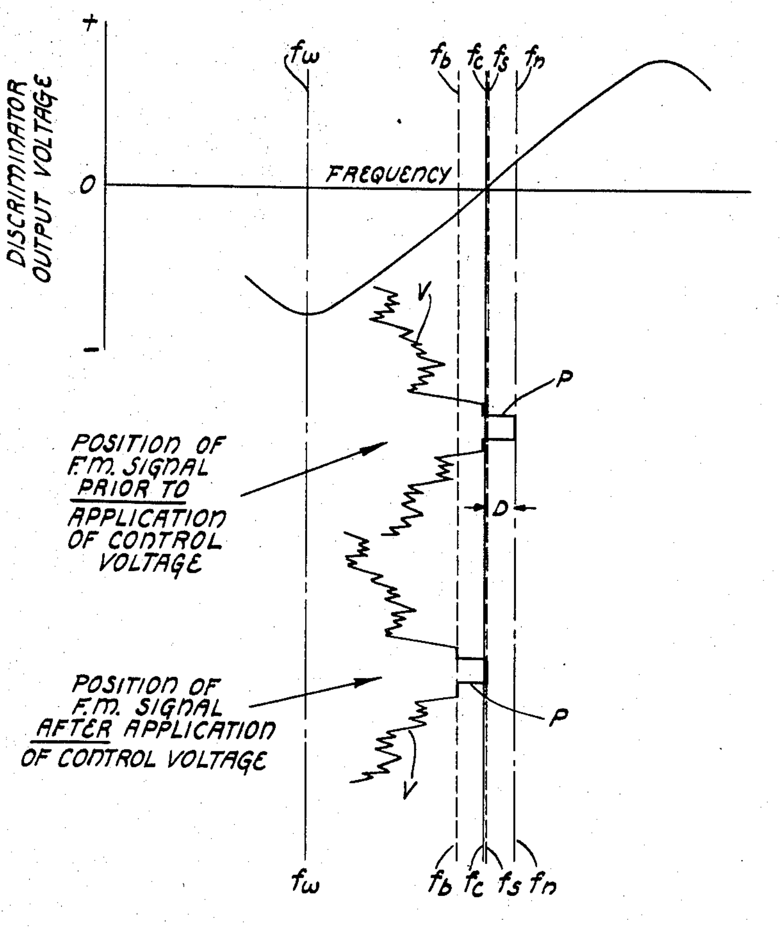

These and other objects, advantages and features of the present invention will become clear from a consideration of the following detailed description and accompanying drawings wherein Figure 1 is a diagrammatic illustration of a frequency-modulation television relay-system embodying my improved arrangement, and Figure 2 is a graphical representation given to facilitate understanding of the operation of the system of Figure 1.

Referring now to Figure 1, there is illustrated, partly in block form, a frequency-modulation television relay-system comprising a carrier-frequency amplifier 3, a frequency-converter or mixer stage 4, a beating oscillator 5, and a second carrier-frequency amplifier 6. These components are of conventional form and detailed description thereof is unnecessary. The incoming frequency-modulated carrier signal is amplified in amplifier 3 and is converted to a different carrier frequency in conventional manner in mixer 4 by the heterodyne action of beating oscillator 5. Amplifier 6 is adapted to amplify the converted frequency-modulated carrier, and the wave may then be transmitted to another relay station, or to a terminal station, or may be broadcast, as the case may require.

In a typical system, and by way of example, the modulated carrier received by the system of Figure 1 may occupy the band extending from 65 to 85 megacycles. If then the modulated carrier signal is to be converted to occupy the band extending from 105 to 125 megacycles the oscillator 5 may be operated at a frequency of 190 mc. to effect such conversion. The amplifier 3 and 6 would, of course, be arranged to operate over the frequency bands 65 to 85 and 105 to 125 megacycles respectively.

An illustration of the general character of the frequency-modulated carrier signal employed in frequency-modulation television systems may be seen in Figure 2. In that figure, the axis of abscissae represents different frequency values. The dot-and-dash line $f_w$ represents the preassigned white-level frequency of the picture-intelligence component of the converted modulated carrier; the dotted line $f_b$ represents the preassigned black-level or blanking-level frequency of the picture-intelligence component of the converted carrier; and the dashed line $f_s$ represents the preassigned synchronizing-level frequency of the converted synchronizing pulse P. The picture-intelligence component V of the converted modulated carrier varies between the frequency limits $f_w$ and $f_b$. The synchronizing-pulse component of the converted modulated carrier comprises the time-spaced pulses P, the peaks of which are desirably leveled accurately along the frequency line $f_s$.

The automatic-frequency-control means provided by the present invention utilizes the existence, in the frequency-modulation television system, of the synchronizing pulses which occur cyclically at a relatively high repetition rate and which occur, or at least are intended to occur, at a fixed unvarying carrier-frequency level, referred to herein as the synchronizing-level frequency.

It should be understood that the present invention is not limited, in its application, to television relay stations. It may be employed, for example, at an originating television transmitter to maintain the modulated carrier within its preassigned band. Or the invention may be employed in television receivers to maintain the black-level at a fixed value. This is accomplished by holding the synchronizing-level at a fixed value, the separation between the black and synchronizing-level being substantially constant. When employed in receivers or at relay-stations, the circuit is effective both to compensate for any drift which may have occurred in the frequency of the received carrier, as well as to prevent deleterious drift in the local beating oscillator, exclusive, of course, of such deviation as may be required to accomplish the aforesaid compensation.

A preferred form of circuit arrangement employable at relay stations and embodying our invention is shown in Figure 1 and will now be described. Deviator means 7 are provided in association with oscillator 5 to vary the resonant frequency of the oscillator in response to a control voltage supplied by way of connection 8. Deviator 7 may take any conventional form, as for example, a reactance tube shunted across the tuned circuit of oscillator 5. Since deviator means are well known, a detailed explanation thereof is unnecessary.

If the system is operating at very high frequencies, as for example, of the order of 1000 megacycles or higher, oscillator 5 may be a reflex klystron, and in that case the control voltage may be applied directly to the repeller-electrode, the application of a D.-C. voltage to the repeller-electrode of a reflex-klystron being a well known means of shifting or controlling the oscillating frequency.

In accordance with the present invention, the control voltage is obtained from an arrangement comprising, essentially, a frequency-discriminator 9 and a peak detector 16.

Frequency-discriminator 9 is preferably conventional, and as shown in Figure 1 has the form, now well known, described by Seeley in U. S. Patent 2,121,103. The action of frequency-discriminator 9 will be readily understood by those skilled in the art and only brief mention thereof will be made here. Primary circuit 19 and secondary circuit 20 of discriminator 9 are both tuned to the same resonant frequency $f_c$, and when the applied frequency is equal thereto, the output voltage of frequency-discriminator 9 is zero. When the frequency applied to discriminator 9 deviates from the preselected resonant frequency $f_c$ to which circuits 19 and 20 are tuned, an output voltage is developed, the polarity of which hinges upon the direction of the frequency deviation, and the magnitude of which depends upon the extent of the frequency deviation. The resonant frequency $f_c$, referred to above, is consequently the zero crossover frequency of the discriminator; and as will become clear from the ensuing description, frequency $f_c$ is very slightly different from the preassigned synchronizing-level frequency $f_s$ of the converted synchronizing pulse P.

In Figure 2, there is shown an illustrative output voltage-versus-frequency characteristic for discriminator 9. In the illustration, the output voltage is shown to be zero at frequency $f_c$, to be positive for frequencies higher than $f_c$, and to be negative for frequencies lower than $f_c$. It will be understood, of course, that discriminator 9 may, if desired, be arranged to have a characteristic which is the reverse of that shown in Figure 2, that is, having an output voltage characteristic which is positive for frequencies lower than the crossover frequency and negative for higher frequencies.

Referring again to Figure 1, peak-detector 16 comprises a diode 17 and an RC circuit 18, the latter being comprised of resistance 25 and capacitance 26. Circuit 18 has a time-constant RC which is long in comparison to the time interval between synchronizing pulses and consequently there is developed across diode 17 a D.-C. voltage $e_{17}$ whose magnitude is a measure of the peak video voltage applied to detector 16.

In our improved circuit, the specific function of peak-detector 16 is to develop a D.-C. voltage whose magnitude is a measure or function of the departure of the synchronizing pulse peaks P from the preassigned synchronizing-level frequency $f_s$. To assist the peak detector in performing this function, a video-amplifier 12 may be employed having a clipper circuit 10 inserted ahead of it adapted to pass all video voltages of a preselected polarity and to suppress voltages of opposite polarity. In the illustrated embodiment shown in the drawings and described in detail herein, the preselected polarity is positive.

Clipper circuit 10 includes a diode element 13 which may be a vacuum tube, but preferably comprises a crystal diode, as for example, a germanium diode identified commercially as type 1N34. The principal advantage of employing a crystal diode is that it introduces a fixed zero reference voltage into the circuit; and the unstable contact potential, which is associated with a vacuum tube diode, is consequently avoided. Resistor 14 functions as the load resistor for diode element 13. Capacitor 15, shown in shunt across resistor 14, may be omitted when diode 13 is functioning as a clipper; the purpose of capacitor 15 is mentioned subsequently herein. Series resistor 27 and shunt capacitor 28, shown in Figure 1, function as a low-pass filter circuit.

The operation of our improved automatic-frequency-control system at a television relay station will now be described. Oscillator 5 is initially tuned, as by manual adjustment, to a base resonant frequency of such value that if the same were to be beat in frequency-converter 4 with the incoming frequency-modulated carrier signal, the converted non-controlled synchronizing-level frequency $f_n$ (Figure 2) would be substantially different from the crossover frequency $f_c$ of frequency-discriminator 9, the departure D being in a predetermined direction. In the system illustrated in Figures 1 and 2 of the drawings, the direction of the departure D is toward the higher frequencies, i. e. to the right of crossover frequency $f_c$ as seen in Figure 2. The magnitude of the departure D is preferably equal to an amount slightly less than the height of the synchronizing pedestal, that is, to slightly less than the difference between the black-level frequency and the synchronizing-level frequency.

If desired, the converted non-controlled synchronizing-level frequency $f_n$ may be located closer to, or farther from, frequency $f_c$ than is shown in Figure 2. It should not, however, be located so close to crossover frequency $f_c$ that the separation therebetween is less than the anticipated drift; and $f_n$ should not coincide with $f_c$. Although not preferred, frequency $f_n$ may, if desired, be placed so far to the right that substantial portions of, or all of, the picture-intelligence components V of the converted carrier are in the positive potential area.

In short, in the illustrated embodiment, oscillator 5 is initially tuned, manually or otherwise, to a base resonant frequency of such value that, if the control voltage from deviator 7 be removed, as by opening switch S, the converted non-controlled synchronizing-level frequency $f_n$ would be higher than crossover frequency $f_c$ by a substantial amount. But as will be described in a moment, with switch S in its normal closed position, the control voltage applied by way of lead 8 is effective to decrease the converted synchronizing-level frequency and cause it to take up a fixed frequency position indicated as $f_s$ in Figure 2, which nearly coincides with crossover frequency $f_c$ but which is very slightly higher. A convenient way of tuning oscillator 5 to the desired base frequency comprises opening switch S, placing a vacuum tube voltmeter across capacitor 28, and then tuning oscillator 5 until the desired voltage is read.

Referring again to both Figures 1 and 2 and assuming oscillator 5 to be tuned to a preferred base frequency, i. e. to a base frequency which effects a departure of the synchronizing-level frequency not in excess of the amplitude of the synchronizing pulse, it will be seen that, in the absence of a deviation control voltage, discriminator 9 delivers a positive voltage for the synchronizing pulses P and a negative voltage for the picture intelligence V.

If amplification be required, the voltages developed by discriminator 9 are applied to the plate of clipper-diode 13 which passes the positive synchronizing pulses but suppresses the negative picture-intelligence signals. The positive synchronizing pulses delivered by clipper-diode 13 are then applied to video-amplifier 12 which, in the circuit of Figure 1, is assumed to be comprised of an even number of stages so that the polarity of the signal applied to peak-detector 16 is unchanged, that is, is positive in the present illustration.

The positive video pulses impressed upon diode 17 are effective to develop a negative D.-C. voltage $e_{17}$ whose magnitude is a measure of the peak values of the positive synchronizing pulses P. This negative D.-C. voltage is then applied by way of lead 8 to deviator 7 which, by its action upon the tuned circuit of oscillator 5, shifts the resonant frequency of the oscillator to a value such that the converted synchronizing-level frequency moves to a fixed value $f_s$ which very nearly equals the crossover frequency $f_c$.

It will be understood that when the frequency of oscillator 5 shifts in the direction indicated above, the control voltage developed by the system diminishes, and that the converted controlled synchronizing-level frequency $f_s$ will not coincide with crossover frequency $f_c$, for in that event the control voltage $e_{17}$ would be zero and oscillator 5 would tend to return to its initially tuned base resonant frequency. Nevertheless, it is within the capabilities of our novel system to maintain the controlled synchronizing-level frequency $f_s$ at a value, during operation, which is very close to zero crossover frequency $f_c$. This flows from the fact that in our preferred embodiment we are able to amplify, to any required level, the very small video voltages, representing the synchronizing pulse tips, which may be delivered by clipper 10, and thereby to obtain control voltages of any desired magnitude.

If amplification is not required, video-amplifier 12 and peak-detector 16 may both be omitted, and peak-detection may be accomplished by means of diode 13, resistance 14 and capacitance 15. In this case, the values of resistance 14 and capacitance 15 are, of course, so chosen as to give the network a long RC time-constant relative to the intervals between synchronizing pulses.

We have stated above that, if desired, oscillator 5 may be manually tuned to a base resonant frequency of such value that, in the absence of the control voltage, all or portions of the converted picture-intelligence may be located to the right of crossover frequency $fc$ in Figure 2. The control voltage will be nevertheless independent of picture content since the control voltage operates upon oscillator 5 to shift its frequency in the desired direction and thereafter only the converted synchronizing pulse tips are able to develop a positive voltage at the terminals of discriminator 9.

While we have described our frequency control system as operating upon the positive output voltage of discriminator 5, it will be understood that it may just as readily be adapted to operate upon the negative portion of the output-versus-frequency characteristic.

And while we have described our novel AFC system in the specific environment of a television relay-station, it will be apparent to those skilled in the art that our basic arrangement is equally capable of preventing or controlling oscillator frequency-drift in frequency-modulated television transmitters, or in frequency-modulated television receivers, whether or not a relay system is involved.

Having described our invention, we claim:

1. A system for stabilizing peak frequency-deviations of a frequency-modulated carrier wave at a substantially fixed limit-frequency, said system comprising an oscillator whose operating frequency establishes the frequency of said carrier wave, a frequency discriminator adjusted to yield zero output at said fixed limit-frequency, said discriminator being adjusted also to yield an output voltage of one polarity for frequencies outside the limit defined by said fixed limit-frequency and an output voltage of opposite polarity for frequencies within the limit defined by said fixed limit-frequency, said oscillator being initially adjusted to cause said frequency-modulated carrier wave to deviate from its desired position in the spectrum in a direction such that deviations outside said fixed limit-frequency do occur, means coupled to the output circuit of said discriminator and responsive only to voltages of said one polarity for establishing a control voltage, a frequency control device coupled to said oscillator, and means for applying said control voltage to said frequency control device to cause the operating frequency of said oscillator to shift in a direction to oppose deviations of said carrier wave outside said fixed limit-frequency.

2. In a system having a source of asymmetrically frequency modulated carrier wave whose unmodulated frequency is a function of the frequency of a controllable oscillator included in said source, the improvement which comprises the provision of means for maintaining the extreme excursions of the modulated wave at a selected fixed frequency, said means comprising: a differential frequency discriminator responsive to said modulated wave and adjusted to produce zero output voltage at said selected fixed frequency; a peak detector responsive to discriminator output voltages of predetermined polarity for developing a direct-current voltage; and control means responsive to said direct-current voltage for controlling the frequency of said oscillator as a function of the magnitude of said direct-current voltage, said oscillator being so adjusted that, in the absence of direct-current voltage applied to said control means, said discriminator would, in response to said selected fixed extreme-excursion frequency, produce an output voltage of said predetermined polarity and of substantial magnitude.

3. In a system having a source of asymmetrically frequency modulated carrier wave whose unmodulated frequency is a function of the frequency of a controllable oscillator included in said source, the improvement which comprises the provision of means for maintaining the extreme excursions of said wave at a selected fixed frequency, said means comprising: a differential frequency discriminator responsive to said modulated wave and adjusted to produce zero output voltage at said selected fixed frequency; a peak detector responsive to discriminator output voltages of predetermined polarity for developing a D.-C. voltage; and control means responsive to said D.-C. voltage for changing the frequency of said oscillator in such direction as to oppose the development of said D.-C. voltage, said oscillator being so adjusted initially that, in the absence of said D.-C. voltage applied to said control means, said discriminator would, in response to said selected fixed extreme-excursion frequency, produce an output voltage of said predetermined polarity and of substantial magnitude.

4. In a system having a source of asymmetrically frequency modulated carrier wave whose unmodulated frequency is a function of the frequency of an oscillator included in said source and having frequency-deviation means associated therewith, the improvement which comprises the provision of means for maintaining the extreme frequency of said modulated wave at a selected fixed frequency, said means comprising: a differential frequency discriminator responsive to said modulated wave and adjusted to produce zero output voltage at substantially said selected extreme frequency; a peak detector responsive to discriminator output voltages of predetermined polarity for developing a direct-current control voltage; means adjusting said oscillator to such frequency that, in the absence of said direct-current control voltage applied to the frequency-deviation means of said oscillator, said discriminator would, in response to said selected fixed extreme frequency, produce an output voltage of said predetermined polarity and of substantial magnitude; and means for applying said direct-current control voltage to said frequency-deviation means for changing the frequency of said oscillator in such direction as to oppose the development of said direct-current voltage.

WILSON P. BOOTHROYD.
WILLIAM H. FORSTER.

REFERENCES CITED

The following references are of record in the file of this patent:

UNITED STATES PATENTS

| Number | Name | Date |
|---|---|---|
| 2,279,659 | Crosby | Apr. 14, 1942 |
| 2,290,517 | Wilson | July 21, 1942 |
| 2,296,919 | Goldstine | Sept. 29, 1942 |
| 2,305,864 | Gottier | Dec. 22, 1942 |
| 2,316,017 | Peterson | Apr. 6, 1943 |
| 2,339,851 | Hansell | Jan. 25, 1944 |
| 2,354,827 | Peterson | Aug. 1, 1944 |
| 2,396,688 | Crosby | Mar. 19, 1946 |